June 15, 1965  H. E. HARRIS, JR., ETAL  3,189,699
VERY HIGH SPEED COMMUTATING SYSTEMS
Filed March 5, 1962  3 Sheets-Sheet 1
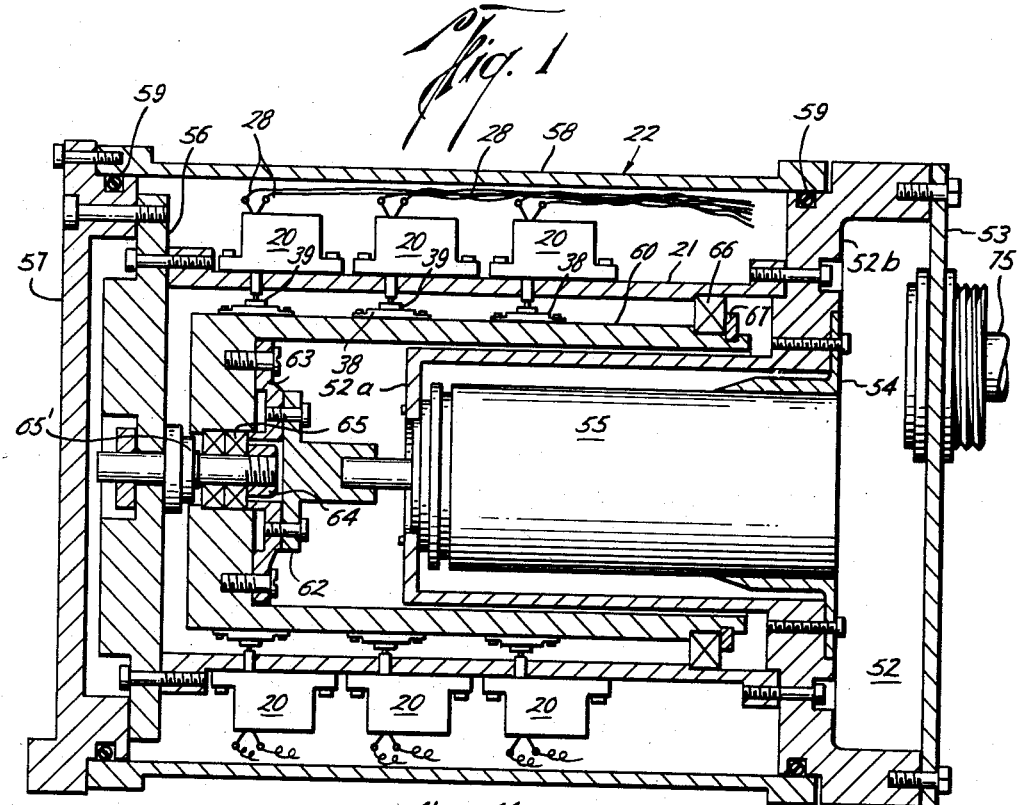
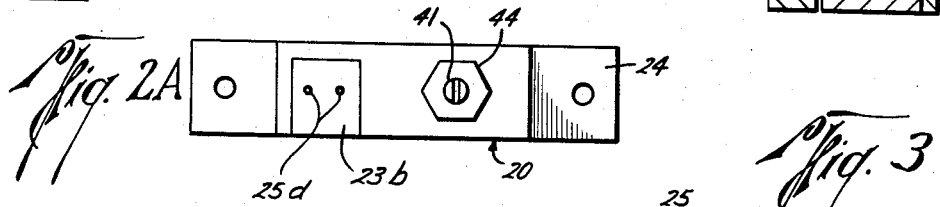
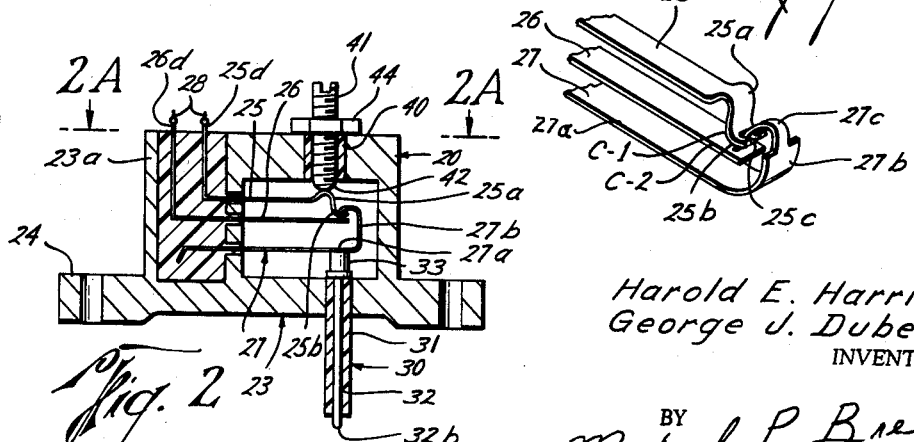
Harold E. Harris, Jr.
George J. Dubell
INVENTORS
BY Michael P. Breston
ATTORNEY June 15, 1965 H. E. HARRIS, JR., ETAL 3,189,699
VERY HIGH SPEED COMMUTATING SYSTEMS
Filed March 5, 1962 3 Sheets-Sheet 2
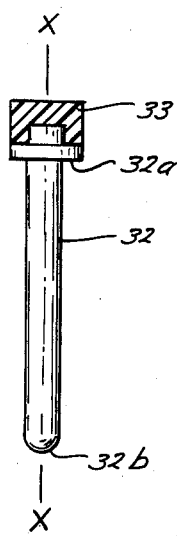
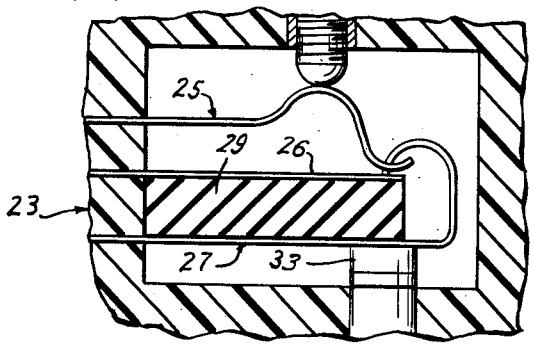
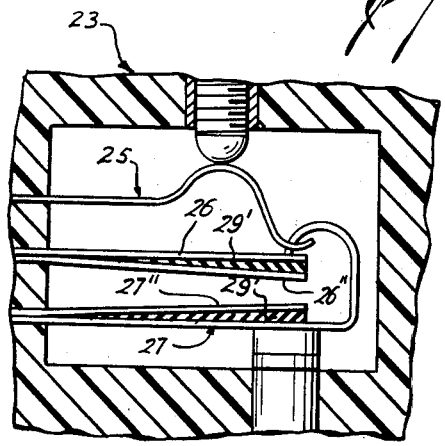
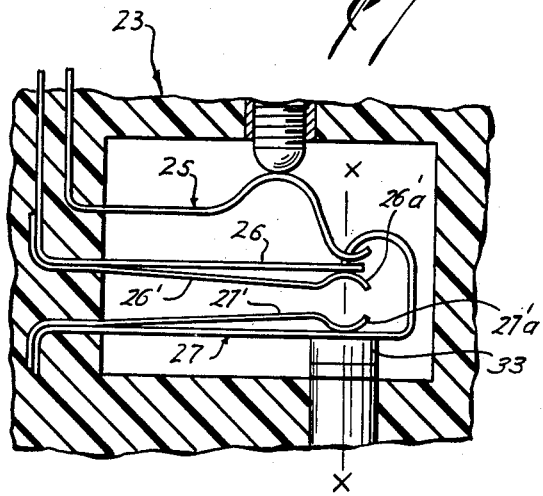
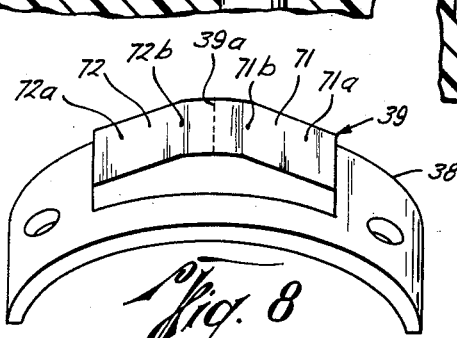
Harold E. Harris, Jr.
George J. Dubell
INVENTORS
BY Michael P. Breston
ATTORNEY

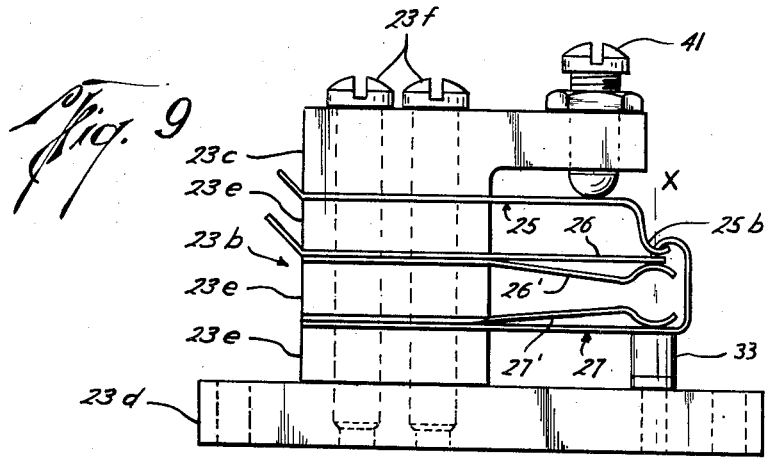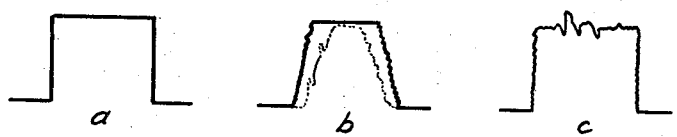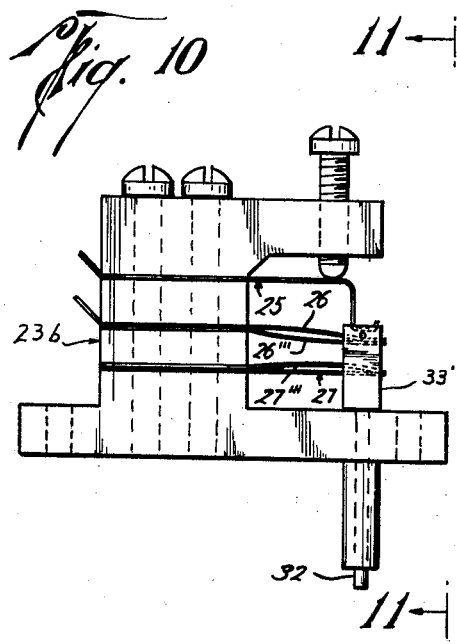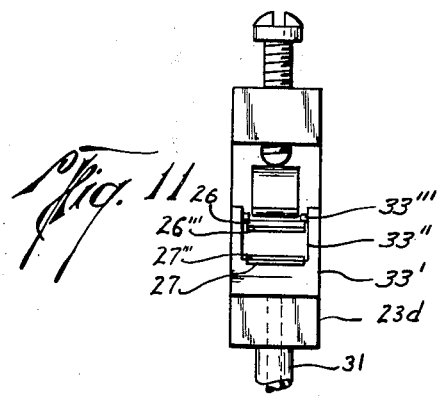

United States Patent Office 3,189,699
Patented June 15, 1965

3,189,699
VERY HIGH SPEED COMMUTATING SYSTEMS
Harold E. Harris, Jr., Old Bridge, and George J. Dubell, Hightstown, N.J., assignors to Electro-Mechanical Research, Inc., Sarasota, Fla., a corporation of Connecticut
Filed Mar. 5, 1962, Ser. No. 177,328
19 Claims. (Cl. 200—31)

This invention generally relates to very high-speed commutating systems and more particularly to commutating systems especially suitable to perform a wide variety of functions including mechanical gauging, displacement detecting, switching and scanning of electric signals, etc.

In many systems, for example in telemetry, the output signals of one or more transducer sources, as of thermocouples, photocells, strain gauges, accelerometers, etc., must be coupled to a common utilization device. This is ordinarily accomplished by coupling the output signal of each transducer to one terminal of a commutator which periodically samples or scans the respective amplitudes of the signals. Typically, the values of the respective transducers' impedances and signal levels are relatively low. It is essential therefore that the commutator introduce only negligible distortions during the sampling else the ensuing noise may blank out the transducers' intelligence signals.

Generally, prior art mechanical switching systems or commutators were undesirably limited in one or more of the following respects: (1) insufficient commutating speeds, (2) severe environmental service conditions such as high temperatures, vibrations and shock deleteriously affecting the commutator's efficiency, (3) relatively high values of edge noise, contact noise and contact resistance, (4) excessive friction between the make and break contacts resulting in a progressive accumulation of minute metallic particles between the contacts, in a progressive deterioration of the switch's insulation resistance, and in a rapid decrease of the switch's useful life, (5) relatively high contamination of the contacts caused mainly by organic polymers, and (6) often needed time-consuming and expensive repairs.

In United States Patent 2,993,963 issued to George M. Beardow, on July 25, 1961, there is disclosed a commutator for sequentially closing one or more electric circuits in a manner which largely overcomes some of the above enumerated deficiencies. In many present-day applications however it is still necessary to provide (1) greater commutating speeds, lower values of edge noise, contact noise, and contact resistance, (2) reduced friction between the switch's contacts and (3) elimination of the contamination of the contacts.

Accordingly, it is a general object of the present invention to provide new and improved very high-speed commutating systems which largely overcome the aforesaid and other apparent limitations of the prior art.

It is another object of this invention to provide new and improved commutating systems of the foregoing character which are especially suitable for commutating signal sources whose impedances and signal levels are relatively low without introducing appreciable distortions.

It is a further object of this invention to provide new and improved commutating systems of the foregoing character capable of operating efficiently under severe environmental physical conditions and of providing great flexibility and long operating life.

It is a still further object of this invention to provide new and improved commutators of the foregoing character which can be very economically manufactured.

Broadly speaking, these and other apparent objects and advantages are attained in accordance with the invention by providing commutating systems including one or more fast responding miniature switching units, each unit comprising an adjustable contact, a mating movable contact and restraining means, the movable contact being resiliently biased for movement into electrical engagement with the adjustable contact, the restraining means being adapted to restrain the engagement between the movable contact and the adjustable contact and to free, in response to actuating means, the movable contact; the points of impact between the respective members of the switching units preferably lying in a single plane to assure negligible bounce between the contacts.

The preferred embodiments of the invention will be fully described in the following detailed description when taken in conjunction with the accompanying drawings, in which:

FIG. 1 shows the commutator partly in cross-section;
FIG. 2 shows a cross-sectional view of one embodiment of the switching unit;
FIG. 2A is a top view of FIG. 2;
FIG. 3 is a perspective view of the engageable arms in the embodiment of FIG. 2;
FIG. 4 shows the actuating rod assembly;
FIGS. 5–7 are modifications of the switching unit shown in FIG. 2;
FIG. 8 is a perspective view of the actuating cam;
FIG. 9 is an elevational view of another embodiment of the switching unit;
FIG. 10 shows a modification of FIG. 9;
FIG. 11 is a side view of the switching unit of FIG. 10; and
FIG. 12 represents wave forms helpful in explaining the operation of the switching units.

Referring now to FIG. 1, one or more miniature switching units or elements 20 are mounted on the outer periphery of a tubular housing support member 21 for becoming periodically and rapidly actuated by a commutating assembly generally designated as 22. The switching elements may be positioned serially, closely adjacent one another around a circumferential row. Obviously one or more axially displaced rows may be provided, only three such rows are being depicted in FIG. 1. Before proceeding with the detailed description of the commutating assembly 22, the preferred embodiments of the switching units 20, in accordance with the invention, will first be described.

Referring now to FIGS. 2, 2A, 3 and 4, there is shown a switching unit 20 housed in a frame 23 having ears 24 for bolting the switching unit to the housing 21. Extending through the base of frame 23 is an actuating assembly 30 comprising a tubular member 31 pressure fitted into the base for slidably supporting an actuating rod 32. The rod's upper end is flared out to define a retaining surface 32a which supports a cylindrical actuating head 33 made of a suitable insulating substance, as of epoxy resins, glass or synthetic mica. The rod's lower end 32b is rounded out and projects from the tubular support member 31 to become periodically actuated by a gradual, upwardly directed force which lifts the actuating head 33 a prescribed distance above its position of rest. Mounted opposite to, and slightly axially displaced from, the actuating assembly 30 is a screw member 41 carrying at its inner free end a semi-spherical tip 42 of an insulating substance such as glass. The screw 41 is threadedly engageable into an insulating sleeve 40 and is locked in position by a nut 44.

Extending from the left wall 23a is an adjustable stationary switch contact arm 25, a movable switch contact arm 26, and a restraining arm 27. The arms are preloaded so that the stationary contact arm 25 is resiliently biased toward the insulating tip 42 provided by the adjustable screw member 41. Similarly, the restraining arm 27 is biased toward the actuating head 33, and the movable contact arm 26 is biased toward its mating stationary contact arm 25. Thus, contact arms 25 and 26 are biased upwardly, whereas restraining arm 27 is biased downwardly. When not actuated, the bias of the restraining arm 27 is of sufficient strength to overcome the bias of the movable arm 26 thereby preventing the engageable contact arms 25, 26 from establishing electrical contact. To minimize the tendency of arms 25-27 to vibrate in a lateral direction and to confine their vibrations into a direction parallel to the push rod's axis, the arms are preformed from thin flat strips. Also, to assure minimum contact resistance, the strips are selected from low resistance alloys, preferably including a noble metal, such as gold, to which small amounts of silver and copper may be added for obtaining additional mechanical strength. Since each switch element 20 is of miniature size, the arms' masses are small. Consequently, the accelerating forces acting upon them, when the commutator is mounted for example in a rapidly accelerating missile, are of low magnitudes thereby minimizing the tendency of disruptive forces to cause erratic engagements between the arms. Thermocouple voltages between the arms' contacting surfaces are practically eliminated by making the arms of the same material.

To achieve faster "ON" and "OFF" switching, the points of contact between the respective arms are made to lie in a single plane, preferably parallel to the actuating force and substantially coincident with the actuating rod's axis X—X. Although the arms' contacting surfaces may be flat, optimum contacting forces however between the respective engaging arms are achieved by giving the contacting surfaces a cylindrical shape.

As more clearly shown in FIG. 3, the higher operating speeds and the greater contacting forces are achieved by making the free end of the stationary contact arm 25 S-shaped to define a curved portion 25a, biased toward the glass tip 42, and a curved portion 25b, from which a channel 25c is cut out to allow for the free passage of a restraining yoke such as a finger 27c, forming an integral part with the restraining arm 27. Inasmuch as the contacting surfaces between the arm 25 and the adjustable screw 41 are cylindrical, their points of contact remain substantially the same even though the screw may be raised or lowered between its allowable limits. The peak surface of portion 25b on arm 25 defines the "stationary" switch contact C-1.

The contact arms 25 and 26 project substantially equidistantly from the left hand wall 23a and the surface on arm 26 immediately opposite to contact C-1 defines the "movable" switch contact C-2. The restraining arm 27 has a flat lateral portion 27a, resting upon the upper surface of the actuating head 33, and an axial, inverted, U-shaped portion 27b, one leg of which serves as the restraining finger 27c for normally disengaging the switch's contacts C-1 and C-2.

To overcome the downwardly directed force exerted by the restraining finger 27c against the movable switch contact C-2, thereby freeing the movable contact arm 26 for electrical engagement with the stationary contact arm 25, an upwardly directed axial force is impressed onto the restraining arm 27. Although this axial force may be communicated in a variety of manners, the preferred method consists in raising the restraining arm 27 mechanically with the aid of the actuating rod 32, in a manner to be subsequently described. To facilitate the connection of electric conductors to the switch's contacts C-1 and C-2, the contact arms 25 and 26 respectively project portions 25d and 26d thereof so that flexible hook-up wires 28 may be soldered thereto. The frame 23 may be made of a suitable metal, such as aluminum, and the arms 25-27 may be potted into an insulating sleeve 23b. The arms are properly oriented during the embedding with the aid of a suitable jig, so that, when the sleeve 23b is inserted into the recess provided therefor in the wall 23a, the needed biasing forces will be exerted in a manner previously explained. Obviously, if desired, the entire frame 23 can be made of a hard insulating material and the arms 25-27 can be directly embedded therein.

To decrease the amount of contact bounce, a filler 29, preferably of an elastic substance such as rubber, may be inserted in the space between the moving and restraining arms 26, 27, as shown in FIG. 5. Although the use of the filler provides the necessary damping and decreases the amount of contact bounce, it has the disadvantage of imposing an added load upon the actuating head 33, thereby requiring a higher actuating force.

In FIG. 6, the desired damping qualities of the filler substance 29, yet without the accompanying extra burden upon the actuating head 33, is obtained by the use of two pressure springs 26' and 27' which are, respectively, resiliently biased toward their mating arms 26 and 27. The free ends 26'a and 27'a of the respective springs 26' and 27' are curved, as shown, to assure greater resilient biasing forces against their corresponding arms 26 and 27. To avoid thermocouple effects, pressure springs 26', 27' should preferably be made of the same alloy as that used for arms 26, 27.

Another embodiment yielding excellent damping qualities, yet without imposing an undue load upon the actuating head 33, is shown in FIG. 7. This embodiment is in all respects similar to the one shown in FIG. 6 except that now the free ends of the pressure springs 26" and 27" remain flat. A layer of absorbent elastic material 29' is sandwiched between members 26, 26" and 27, 27". This absorbent material, which may, for example, be a synthetic compound of silicon, cushions the dynamic forces of impact.

In FIG. 9 is shown another embodiment of the switching unit 20 featuring the double advantage of affording easy mounting of the arms and spring elements and of eliminating frictional polymer contamination. The switching element's frame, generally designated as 23b, is made up of blocks so that, when assembled, they form a frame, similar to frame 23 of FIG. 2 but without the right-hand wall opposite to wall 23a. Frame 23b in FIG. 9 includes an upper portion 23c and a base portion 23d. The adjustable stationary contact arm 25 is sandwiched between the upper portion 23c and an intermediate segment 23e. Similarly, two other segments 23e are also respectively interposed, on one hand between arms 26 and 27 and, on the other hand, between arm 27 and base 23d. Each of the arms and springs may assume any of the forms previouslly described. For completeness of the drawing, the frame 23b is provided with an internal arrangement of arms and springs similar to the one shown in FIG. 6, the same numerals being assigned to similar parts. The various segments are fixedly held together by screws 23f, as shown.

When frame 23b is made of an organic material, an insulating film progressively deposits upon the respective arms' surfaces and, after a relatively short period of time, the switch becomes defective. This phenomenon is believed to be caused by "frictional polymer contamination." To avoid the interposition of the insulating layer between the switch's contacts, the frame 23b is made of an inorganic substance, such as glass or glass bonded mica. In FIGS. 10 and 11 is shown another embodiment, the frame of which is similar to the frame of the embodiment depicted in FIG. 9, as identified by like numerals. In FIG. 10, however, the free end of the stationary arm 25 is L-shaped. The tip of arm 25 serves as the stationary contact C-1. Two pressure springs 26''' and 27''' are again provided for exerting biasing forces against their respective mating arms 26 and 27. Instead of the cylindrical actuating head 33 previously described, there is now provided a bifurcated head 33', forming an integral part with the actuating rod 32. Head 33' provides a yoke in the form of a U-shaped recess 33" having two laterally extending pins 33''' arranged to prevent the engagement between the mating contact arms 25 and 26. As previously explained the downward bias of members 27, 27''' is sufficient to overcome the upward bias of members 26, 26'''. When a force is imparted to the tip 32b of the actuating rod 32, the bifurcated head 33a is raised thereby allowing the engagement of the mating arms 25 and 26.

Referring now to the preferred means for periodically imparting upward forces upon the actuating rods 32, the commutating assembly 22 includes a motor housing 52 having a tubular section 52a, forming integral part with an enlarged base 52b. Bolted to the base 52b are: right hand cover plate 53, collet 54 for fixedly supporting within the tubular section 52a a motor 55, and one end of housing 21. The other end of housing 21 is fixedly secured to the left hand cover plate 57 through a coupling plate 56. To seal off the inner space of the commutating assembly 22, there is provided a tubular sleeve 58, extending from base 52b to cover plate 57. Better sealing action is obtained by inserting O rings 59 underneath each free end of sleeve 58. A rotor 60 is rotatably coupled to the shaft of motor 55 by means of a coupling plate 62, a bearing retainer 63, a bearing nut 64, a bearing assembly 65 and a retaining shoulder 65'. The free end of rotor 60 is rotatably mounted with respect to housing 21 by means of a split-bearing 66, locked in position by a retaining ring 67.

Since the switching units 20 are positioned serially, closely adjacent one another, around one or more circumferential portions on the outer periphery of housing 21, at least one cam is associated with each such circumferential portion.

As shown in FIG. 8, each cam 39 is fixedly supported by a cam holder 38, which is bolted to the cylindrical wall of rotor 60. Cam 39 is adapted for periodically actuating the serially aligned tips 32b of the actuating rods 32 extending from the respective tubes 31. Although cam 39 may assume a variety of forms, to assure a symmetrical rise and fall for the actuating rods 32, it is shaped to have two substantially flat, inclined surfaces 71 and 72, and its peak 39a is preferably rounded out in order to provide a smoother transition between one inclined flat surface to the other. Since each cam encounters during one revolution of rotor 60 as many of the actuating rods as there are switching units 20 serially aligned along a circumferential portion, it is apparent that the cam's contacting surface should have a hardness substantially greater than the hardness of the material forming the actuating rods 32. We have found that very good results are obtained when the cams are made of a synthetic sapphire and the actuating rods 32 of AISI A2 tool-steel. The friction between the cam's surfaces and the actuating rods can be reduced by adding a suitable lubricating film. Finally, the leads 28 connected to each switching unit 20 may be conveniently brought out from cord 75 for connection to a utilization device not shown.

The operation of each switching unit 20 will be better understood by reference to the wave forms shown in FIG. 12 which can be conveniently obtained by connecting a switching unit 20 in series with a resistive load across a suitable voltage source. The wave forms of FIG. 12 may be observed on an oscilloscope, connected across the resistive load. As is well known, an "ideal" switch provides an output pulse as shown in FIG. 12a. Due to wear, contact bounce, and contact resistance, there appears edge noise which causes the output pulse to become distorted as shown in FIG. 12b. After many hours of operation, the pulse's dimensions will further shrink until, eventually, the flat portion of the pulse becomes appreciably reduced, as illustrated by the dotted curve in FIG. 12b. If the switch's contacts are made of dissimilar metals, or if sliding friction takes place, electromotive forces will appear between the switch's contacts thereby causing "contact noise" on top of the pulse, as shown in FIG. 12c.

In the actual operation of a switching unit 20, having an arrangement of arms as illustrated in FIGS. 2, 5-7 and 9, the actuating head 33 raises the restraining finger 27c until the mating contact arms 25, 26 establish electrical contact. Similarly in the embodiment of FIG. 10, the actuating head 33' raises the restraining pins 33''' to allow the mating contact arms 25, 26 to establish electrical contact. Thereafter, arms 26 and 27 (or pins 33''' and arm 26) become disengaged and head 33 (or 33') continues to rise to the peak of its upward stroke. On its downward stroke, the restraining finger 27c (or the set of pins 33''') reestablishes contact with the free end of contact arm 26 thereby disengaging arms 25, 26 and, hence, the switch's contacts C–1 and C–2. Because the contacts' engagements and disengagements are acomplished without acompanying sliding friction, the occurrence of contact noise is substantially eliminated. Moreover, by allowing the restraining finger 27c (or the set of pins 33''') to separate from its associated arm 26, upon the establishment of electrical contact between the mating contact arms 25 and 26, the vibrations of the restraining arm 27 (or of the head 33') are not transmitted to the contact arms 25, 26, thereby avoiding the generation of contact bounce and edge noise. In addition, since, after the removal of the restraining finger 27c (or of pins 33''') from contact C–2, the switch's contacts C–1 and C–2 are pressed toward each other by a constant force, which is substantially equal to the bias of arm 26, no appreciable contact resistance appears. The fact that, in the embodiments of the switching unit 20 of this invention, the amount of contact bounce is negligible is a direct result of keeping the points of contact between the respective arms aligned with the axis of the actuating rod 32. Such an alignment avoids the occurrence of lever-arm effects.

Referring now to the operation of the commutator per se, assume that rotor 60 is made to rotate in a clockwise direction, then, when the cam surface 71 first establishes contact with the actuating rod 32, as at point 71a, the actuating head 33 (or 33') begins to gradually rise until the rod's tip 32b reaches point 71b, at which time the restraining finger 27c (or the set of pins 33''') separates from the free end of the moving contact arm 26, thereby allowing the switch's contacts C–1 and C–2 to make electrical contact. Thereafter, the actuating rod 32 continues to slide upwardly on the cam's surface until it reaches the cam's peak 39a. Upon the rod's downward stroke, the restraining finger 27c (or the set of pins 33''') strikes the free end of the movable contact arm 26, thereby disengaging the mating contact arms 25 and 26 and, hence, breaking the contact between C–1 and C–2. When the disengagement occurs, the rod's tip 32b is at point 72b on surface 27, symmetrically disposed relative to point 71b on surface 71 and, thereafter, it continues to slide downwardly on surface 72 until it reaches point 72a, corresponding to its position of rest. During the second revolution of rotor 60, cam 39 again actuates rod 32 in the manner previously explained, and so on. The operation would be symmetrical were the rotor 60 made to turn in a counter-clockwise direction.

It will be appreciated that the dwell or ON time between the switch's contacts is a function, for a predetermined position of arm 25, of the speed of rotor 60 and of the slope of the inclined surfaces 71 and 72. Consequently, for a constant speed of motor 55, the dwell time can be accurately determined, knowing the geometry of cam 39. For reasons previously explained, each switching unit 20 has its contacts C–1 and C–2 closed, during a small fraction of a second, with negligible contact bounce and minimum contact resistance. The ON and OFF operation of each switching unit, in accordance with the invention, can be accomplished even at a rate of 200 cycles per second or higher. It will be appreciated by a man skilled in the art that the switching units 20 may be employed for other purposes than to periodically commutate electric signals, as for performing mechanical gauging, motion detecting, etc.

Although the principles of the invention have been described and illustrated with particular reference to preferred embodiments of a commutating switching system for the purpose of teaching those skilled in the art how the invention may be practiced, changes in the components, units, and assemblies will appeal to those skilled in the art and it is contemplated that such changes may be made within the scope of our invention as defined in the appended claims.

What is claimed is:

1. An electric switching unit comprising a hollow housing having on its outer periphery making and breaking switch means, said means including a first cantilever spring contact member, a second cantilever spring contact member, and a first cantilever spring bias member mounted adjacent to said second contact member for urging the engagement between said first and second contact members; and actuating means including yoke means movable in response to an actuating force, said yoke means normally disengaging said first and second contact members and freeing said second contact member for engagement with said first contact member upon being actuated by said force.

2. The switching unit of claim 1 wherein said actuating means further include a second cantilever spring bias member mounted on said housing and adapted for urging said yoke means against the action of said first bias member.

3. The switching unit of claim 1 wherein said second contact member establishes a limited first contacting portion with said first contact member when engaged therewith, and said yoke means establish a limited second contacting portion with said second contact member when engaged therewith, said first and second contacting portions lying in the plane of said actuating force.

4. The switching unit of claim 3 wherein said yoke means include a contact breaking member overlying said second contact member and being in said plane.

5. The switching unit of claim 4 wherein said actuating means further include a second cantilever spring bias member mounted on said housing and adapted for urging said yoke means against the action of said first bias member, and a third cantilever spring contact disengaging member mounted on said housing, said yoke means including said contact breaking member forming integral part with said third member.

6. The switching unit of claim 5 wherein the free end of said first contact member is cylindrically shaped and has a recess therein for receiving said contact breaking member.

7. The switching unit of claim 4 wherein said actuating means further include an actuating rod and said yoke means, including said contact breaking member, forming integral part with said rod.

8. The switching unit of claim 2 wherein the free ends of said first and second bias members are cylindrically shaped.

9. The switching unit of claim 5 wherein a layer of absorbant material is sandwiched between said second contact member and said first bias member and between said second bias member and said third member.

10. The switching unit of claim 1 and further including an adjustable screw member mounted on said housing and adapted for adjustably positioning said first contact member relative to said second contact member, the portion of said first contact member making contact with said screw member being cylindrically shaped.

11. The switching unit of claim 1 wherein said housing is made of an inorganic substance.

12. The switching unit of claim 1 wherein said housing is made of a plurality of detachable segments for sandwiching corresponding of said cantilever members therebetween.

13. The switching unit of claim 2 wherein said actuating means include an actuating rod cooperatively mounted with said yoke means on said housing, said rod being raised a predetermined distance by said force to allow the engagement between said first and said contact members without transmitting thereto the rod's vibrations, and a sapphire cam mounted on a rotatable shaft for imparting said force.

14. The switching unit of claim 13 wherein said cantilever members have a rectangular cross-section.

15. An electric switching unit comprising a housing having making and breaking switch means, said means including a first cantilever spring contact member, a second cantilever spring contact member, a cantilever spring bias member adapted to normally disengage said second contact member from said first contact member, a layer of absorbant material sandwiched between said second contact member and said bias member for cushioning the vibrations of said second contact member, and actuating means for disengaging said bias member from said second member.

16. A commutating system comprising a hollow frame a plurality of electrical switching units detachably mounted on the outer periphery of said frame, said units being arranged in groups, a rotatable shaft, means including cam means mounted on said shaft, at least one cam means being associated with each group, each switching unit comprising a housing having making and breaking switch means, said switch means including a first cantilever spring contact member, a second cantilever spring contact member, a first cantilever spring bias member mounted adjacent to said second contact member for urging the engagement between said first and second contact members, actuating means mounted on said housing and including yoke means movable in response to an actuating force applied by said cam means, a second cantilever spring bias member for urging said yoke means against the action of said first bias member thereby normally disengaging said second contact member from said first contact member and freeing said second contact member for engagement with said first contact member when said cam means move said yoke means a predetermined distance, said cam means and said switching units being susceptible of relative displacements whereby selective ones of said switching units are operatively positioned with respect to certain of said cam means dependent upon said relative displacements.

17. The commutating system of claim 16 wherein said second contact member establishes a limited first contacting portion with said first contact member when engaged therewith, and said yoke means establish a limited second contacting portion with said second contact member when engaged therewith, said first and second contacting portions lying in the plane of said actuating force.

18. The commutating system of claim 17 wherein said yoke means include a contact breaking member overlying said second contact member and being in said plane.

19. The commutating system of claim 18 wherein said actuating means further include a third cantilever spring contact disengaging member mounted on said housing, said yoke means including said contact breaking member forming integral part with said third member.

References Cited by the Examiner

UNITED STATES PATENTS 2,339,610  1/44  Baker _____ 200—104
2,993,963  7/61  Beardow _____ 200—30

BERNARD A. GILHEANY, *Primary Examiner.*